United States Patent
Kesling et al.

(10) Patent No.: US 11,147,653 B2
(45) Date of Patent: Oct. 19, 2021

(54) ORTHODONTIC BRACKET HAVING A MOVABLE LIGATING DOOR

(71) Applicant: TP Orthodontics Inc., La Porte, IN (US)

(72) Inventors: Andrew C. Kesling, Three Oaks, MI (US); Ricardo Gonzalez, Valparaiso, IN (US)

(73) Assignee: TP ORTHODONTICS INC., La Porte, IN (US)

( * ) Notice: Subject to any disclaimer, the term of this patent is extended or adjusted under 35 U.S.C. 154(b) by 24 days.

(21) Appl. No.: 16/787,972

(22) Filed: Feb. 11, 2020

(65) Prior Publication Data

US 2021/0244511 A1 Aug. 12, 2021

(51) Int. Cl.
*A61C 7/16* (2006.01)
*A61C 7/28* (2006.01)

(52) U.S. Cl.
CPC .............. *A61C 7/287* (2013.01); *A61C 7/16* (2013.01)

(58) Field of Classification Search
CPC .. A61C 7/28; A61C 7/287; A61C 7/34; A61C 7/14; A61C 7/16; A61C 7/148; A61C 7/141; A61C 7/143; A61C 7/145; A61C 7/12; A61C 7/282; A61C 7/285
USPC ...................................... 433/8, 9, 10, 11, 13
See application file for complete search history.

(56) References Cited

U.S. PATENT DOCUMENTS

| | | | |
|---|---|---|---|
| 4,842,512 A | 6/1989 | Kesling | |
| 4,877,398 A * | 10/1989 | Kesling | A61C 8/0053 433/8 |
| 5,322,435 A | 6/1994 | Pletcher | |
| 5,711,666 A | 1/1998 | Hanson | |
| 6,071,118 A | 6/2000 | Damon | |
| 6,582,226 B2 | 6/2003 | Jordan et al. | |
| 6,663,385 B2 | 12/2003 | Tepper | |
| 6,682,345 B2 | 1/2004 | Kesling et al. | |
| 7,264,468 B1 * | 9/2007 | Kesling | A61C 7/12 433/10 |
| 7,267,545 B2 | 9/2007 | Oda | |
| 7,416,408 B2 | 8/2008 | Farzin-Nia et al. | |
| 8,393,896 B2 | 3/2013 | Oda | |
| 8,414,292 B2 | 4/2013 | Lopes | |
| 8,469,704 B2 | 6/2013 | Oda et al. | |

(Continued)

OTHER PUBLICATIONS

International Search Report and Written Opinion for PCT/US2020/058667 dated Mar. 11, 2021.

*Primary Examiner* — Ralph A Lewis
(74) *Attorney, Agent, or Firm* — Cook Alex Ltd.

(57) ABSTRACT

A self-ligating orthodontic bracket has a bonding base adapted for attachment to the crown of a tooth. A body member is attached to the front surface of the base and extends forwardly to a front face. The base defines a torque angle with respect to the front face of the body. Gingival and occlusal projections extend forwardly from the body member. The projections have archwire slot surfaces which, together with a portion of the body member's front face, define an archwire slot. First and second channels defined in the projections are coplanar and are disposed at an angle to the front face of the body member that is substantially equal to the torque angle. A door is disposed in one of the first and second channels. The door is movable between an open position and a closed position to selectably provide or prevent access to and from the archwire slot.

12 Claims, 14 Drawing Sheets

(56) References Cited

U.S. PATENT DOCUMENTS

| | | | |
|---|---|---|---|
| 9,089,386 B2 | 7/2015 | Hagelganz et al. | |
| 9,339,353 B2 | 5/2016 | Voudouris | |
| 9,468,505 B2 | 10/2016 | Sommer et al. | |
| 10,080,628 B2 | 9/2018 | Sommer et al. | |
| 10,111,732 B2 | 10/2018 | Sommer et al. | |
| 10,182,885 B2 | 1/2019 | Ruiz-Vela | |
| 2003/0180678 A1* | 9/2003 | Kesling | A61C 7/14 433/8 |
| 2010/0105000 A1* | 4/2010 | Scommegna | A61C 7/287 433/10 |
| 2010/0112508 A1* | 5/2010 | Lopes | A61C 7/287 433/10 |
| 2010/0279247 A1* | 11/2010 | Kesling | A61C 7/287 433/10 |
| 2010/0285420 A1* | 11/2010 | Oda | A61C 7/287 433/11 |
| 2011/0076633 A1* | 3/2011 | Bryant | A61C 7/287 433/11 |
| 2013/0260329 A1 | 10/2013 | Voudouris | |
| 2014/0141383 A1 | 5/2014 | Hagelganz et al. | |
| 2014/0272753 A1* | 9/2014 | Sommer | A61C 7/287 433/11 |
| 2015/0223913 A1* | 8/2015 | Yick | A61C 7/287 433/10 |
| 2016/0128807 A1 | 5/2016 | Oda | |
| 2016/0135929 A1* | 5/2016 | Sommer | A61C 7/287 433/11 |
| 2017/0014207 A1 | 1/2017 | Merly | |
| 2018/0153656 A1 | 6/2018 | Oda | |
| 2018/0271623 A1* | 9/2018 | Ruiz-Vela | A61C 7/287 |
| 2018/0318047 A1* | 11/2018 | Kesling | A61C 7/28 |

\* cited by examiner

ORTHODONTIC BRACKET HAVING A MOVABLE LIGATING DOOR

FIELD OF THE DISCLOSURE

The present disclosure is directed generally to an orthodontic appliance for connecting an archwire to a tooth, and more particularly to an orthodontic bracket that has an archwire slot that is open to the front for insertion or removal of an archwire in the bracket. The opening to the archwire slot can be opened and closed by a movable door.

BACKGROUND

The following definitions of dental directional terms will be used herein to explain the structure of the orthodontic bracket of the present disclosure:

Mesial—along and toward the front of the dental arch;
Distal—along and toward the back of the dental arch;
Buccal/labial—normal to the dental arch and toward the cheek or lip, for simplicity this will also be referred as the front or forward direction;
Lingual—normal to the dental arch and toward the tongue, for simplicity this will also be referred to as the back or rear direction;
Tip—inclination of a bracket or tooth in mesial-distal direction;
Torque—inclination of a bracket or tooth in labial-lingual direction;
Occlusal/incisal—toward the biting surface of a tooth;
Gingival—toward the gums; for simplicity the gingival-occlusal/incisal direction may also be referred to as the vertical direction;
Mandibular—toward the lower jaw;
Maxillary—toward the upper jaw.
Upright—inclination of the root of a tooth in mesial-distal direction.

It has been known to provide orthodontic brackets having dual mesial-distally extending tunnels or archwire slots, as for example in U.S. Pat. No. 6,682,345, the disclosure of which is hereby incorporated by reference. Such known brackets may have a labial-buccally opening archwire slot which, when coacting with an archwire and there being selective forces applied between the archwire and bracket, will allow crown tipping movements. An archwire in the rear or uprighting tunnel, when coacting with a rectangular archwire (or any other profile shape archwire, including round) in the outer or forward archwire slot, may provide both torquing and mesial-distal axial control. See U.S. Pat. No. 4,842,512. A problem with this bracket is it requires a ligature to retain the archwires in the labial-buccally opening archwire slots. A ligature is a small flexible band that wraps around tie wings on the bracket to hold the archwire in place. Ligatures can be made of elastomeric material, plastic or metal wire or bands.

The problems resulting from the use of ligatures have been addressed by self-ligating orthodontic brackets that eliminate the need to rely on ligatures for retaining an archwire in the archwire slot of the bracket. A self-ligating bracket is intended to eliminate any problem encountered in ligature failure, whether the ligature is elastomeric or wire in form. Self-ligating brackets also diminish the undesired drag induced by the ligatures. Self-ligating brackets typically have a moveable component that entraps the archwire in its slot. For example, self-ligating brackets that have a ligating latch spring member are disclosed in U.S. Pat. No. 5,711,666.

Other self-ligating brackets use flexible members that bend or flex to allow an archwire to be forced past them into an archwire slot but the flexible members are intended to be stiff enough to prevent release of the archwire during normal use. U.S. Pat. Nos. 6,582,226 and 6,663,385 are examples of such brackets having a flexing ligature built into the bracket.

Another self-ligating bracket is shown in U.S. Pat. No. 9,339,353. This bracket has a movable locking shutter having a pair of resilient arm members which are intended to engage an archwire placed in an archwire slot of the bracket. The shutter applies an active force on the archwire in a direction toward the base or root of the archwire slot. This contrasts with the bracket of the present disclosure wherein the movable door is passive in terms of its interaction with the archwire.

SUMMARY

In one aspect, the present disclosure concerns an orthodontic bracket that is self-ligating and has a movable door to provide or prevent access to and from the outer archwire slot. The bracket of the present disclosure has a bonding base with front and rear surfaces. The rear surface of the bonding base is adapted for attachment to the body of the crown (front or outward facing surface) of a tooth. A body member is attached to the front surface of the base and extends forwardly from the base to a front face of the body member. The front face of the body member defines a reference plane. The bonding base and reference plane define a torque angle between them. However, the torque angle may be incorporated into the bottom of the archwire slot itself as well.

Vertically spaced apart gingival and occlusal projections extend from the front face of the body member. Archwire slot surfaces are formed on the projections, with one projection having an archwire slot surface on the underside thereof and the other projection having an archwire slot surface on the upper side thereof such that the archwire slot surfaces are at least partially in facing relation. The archwire slot surfaces, together with the portion of the body member's front face that is intermediate the archwire slot surfaces of the projections, define an archwire slot.

A first channel is defined in the occlusal projection and a second channel is defined in the gingival projection. The channels are aligned with one another in the same plane. This plane of the first and second channels is disposed at an angle to the reference plane that is substantially equal to the torque angle. A door is disposed in one of the first and second channels. The door is movable, such as by being slidable between an open position and a closed position. When the door is in the open position the door is spaced from the other of the first and second channels so as to provide access to and from the archwire slot. When the door is in the closed position it lies in both the first and second channels and prevents access to and from the archwire slot.

The archwire slot surfaces are vertically separated with the closest vertical separation of the planes of the archwire slot surfaces defining an archwire slot height $H_{min}$. In one embodiment each archwire slot surface comprises a horizontal uprighting stop and a tipping stop disposed at an angle to the uprighting stop. The uprighting stops on the gingival and occlusal projections are diagonally opposed to one another and the tipping stops on the gingival and occlusal projections are diagonally opposed to one another. The minimal slot height $H_{min}$ in this embodiment is between the planes of the gingival and occlusal uprighting stops. That is, the slot height between the uprighting stops is less than the slot height between the planes of the tipping stops. Further, the gingival and occlusal archwire slot surfaces intersect the front face of the body member at a root. The distance from the occlusal root to the lingual surface of the closed door defines a distance D1 and the distance from the gingival root to the lingual surface of the closed door defines a distance D2. The lesser of D1 and D2 is greater than $H_{min}$. With this arrangement generally speaking the depth of the archwire slot is greater than the height. This permits a rectangular archwire to be received in the archwire slot in an angled or canted manner, i.e., the edges of the archwire are not parallel or perpendicular to the walls of the archwire slot. However, even in a canted relation of a rectangular archwire, the archwire slot is deep enough so that a protruding corner of the archwire will not interfere with the closed door.

The orthodontic bracket of the present disclosure is further characterized in that the other of the first and second channels is defined by a bed formed in the projection of said channel and a pair of angle members. Each angle member has a side wall and a tab. The side wall is attached to the bed and extends labially therefrom. The tab is attached to the side wall at a point spaced from the bed and extends mesially-distally therefrom to trap the door underneath the tabs. One end of the tabs has an angled surface. The two angled surfaces of the tabs face one another to define a V-shaped notch which funnels a door-manipulating tool toward an edge of the door. This facilitates moving the door from the closed position to the open position.

DETAILED DESCRIPTION OF THE EMBODIMENTS

The present disclosure is directed to an orthodontic bracket for connecting an archwire to a tooth. A first embodiment of the bracket 10 is shown generally in FIGS. 1-10. The bracket 10 includes a bonding base 12 which has a front surface 14 and a rear surface 16. The bonding base 12 is somewhat of a plate-like member, although it is adapted for bonding to the crown of a tooth and thus it is usually not flat. Instead, the front surface 14 is slightly convex with a corresponding concave rear surface 16 that is adapted for bonding a tooth when in use. The bonding base also could be used on weldable brackets that have no integral pad.

Figure 3:
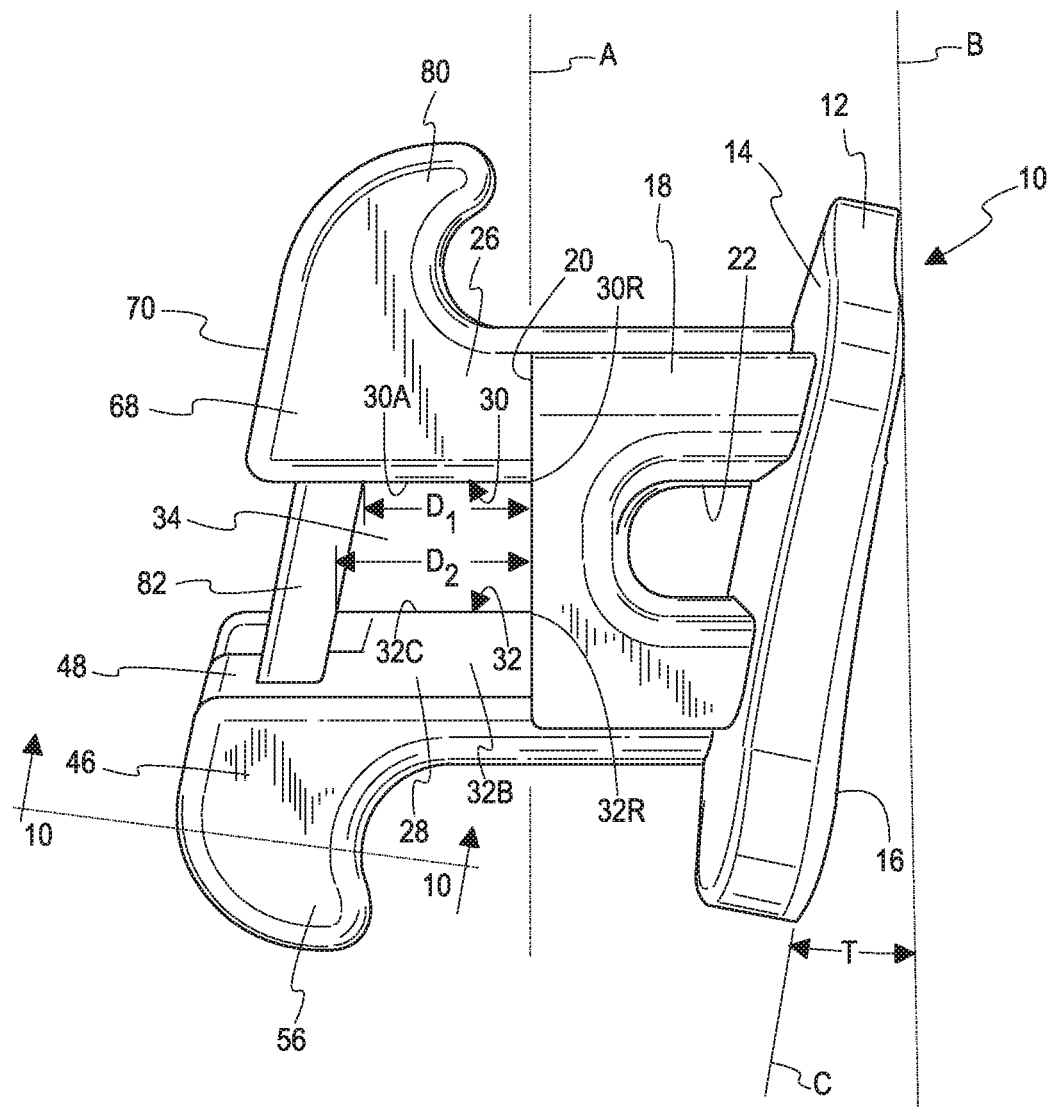
FIG. 3 is a right end elevation view of the bracket of FIG. 1.
Figure 4:
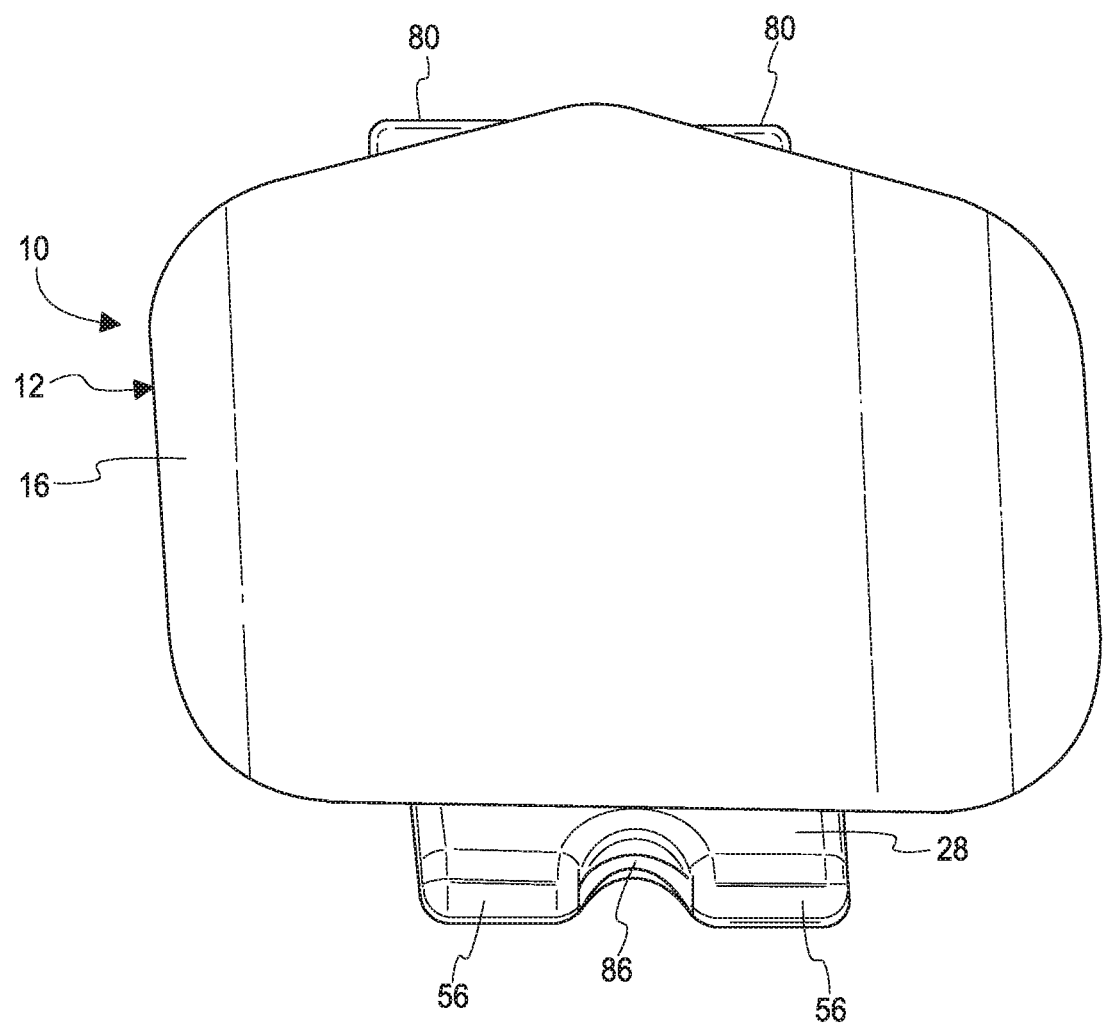
FIG. 4 is a rear elevation view of the bracket of FIG. 1.
Figure 5:
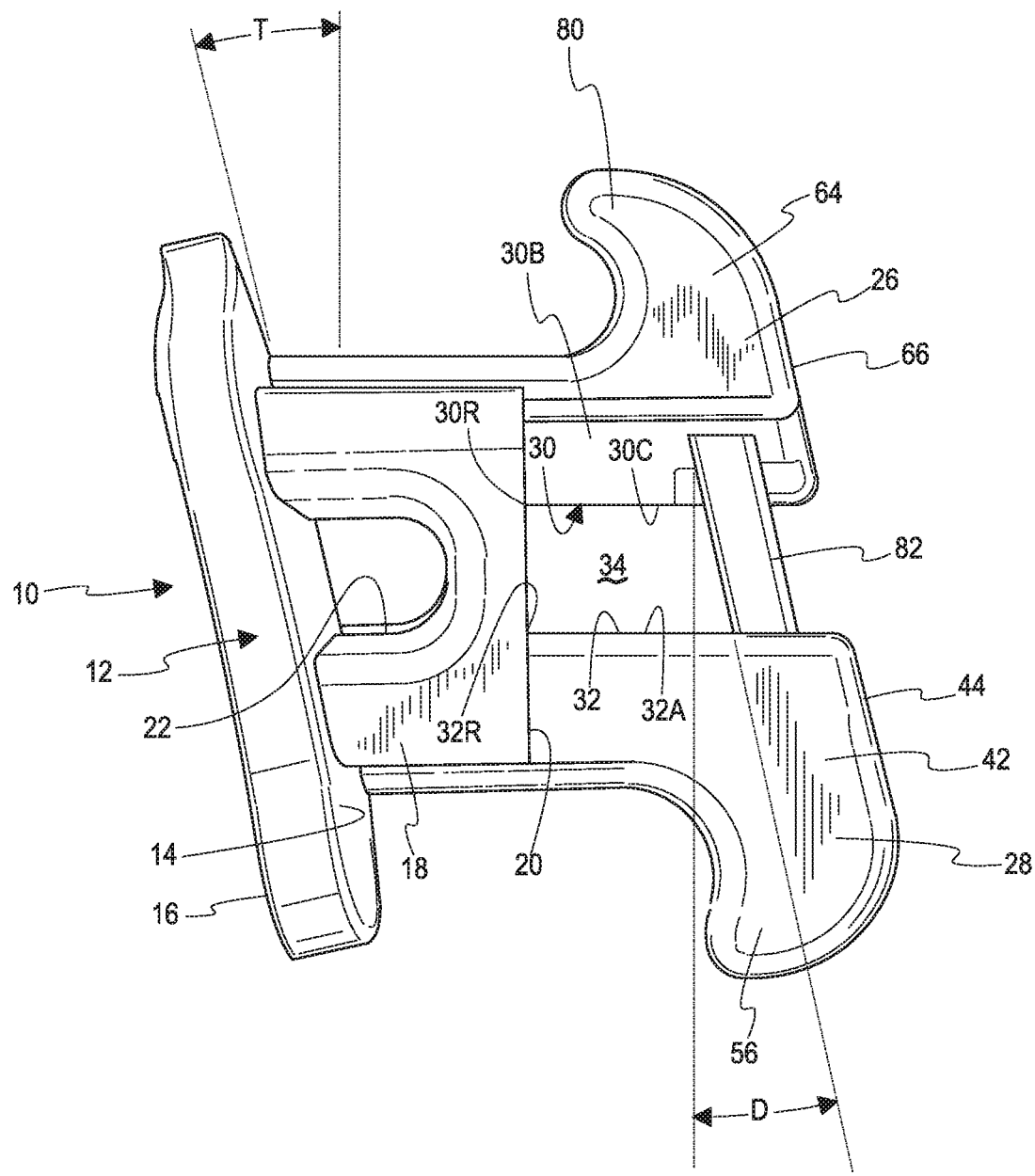
FIG. 5 is a left end elevation view of the bracket of FIG. 1.

The bracket 10 further includes a body member shown generally at 18. The body member 18 is attached to the front surface 14 of the bonding base 12 and extends forwardly therefrom to a front face 20. The body member has circumferentially enclosed horizontal and vertical passageways or lumens extending through it. These include a horizontal uprighting tunnel 22 and a generally vertical auxiliary slot 24. As best seen in FIGS. 3 and 5, the uprighting tunnel 22 is defined on three sides by the body member 18 and on the fourth side by the front surface 14 of the bonding base 12. Similarly, the auxiliary slot 24 is defined on three sides by the body member 18 and on the fourth side by the front surface 14 of the bonding base 12, as best seen in FIGS. 6-10.

The front face 20 of the body member 18 defines a reference plane indicated at A in FIG. 3. Shifting the reference plane A to a point on the rear surface 16 of the bonding base 12 yields a plane B that is parallel to the reference plane A. A plane C is shown generally parallel to an edge of the bonding base 12. The angle between the plane B and the bonding base plane C defines a torque angle T. In the present embodiment the torque angle is 12° but it could be otherwise, as needed for the particular desired treatment.

The orthodontic bracket 10 further includes gingival and occlusal projections 26 and 28 which are attached to the body member 18 in vertically spaced relation to one another. The projections 26, 28 extend forwardly from the front face 20 of the body member 18. Gingival projection 26 has an archwire slot surface 30 formed on one side thereof. Occlusal projection 28 has a similar archwire slot surface 32 formed on one side thereof. The archwire slot surfaces are in opposed facing relation to one another such that the archwire slot surfaces 30, 32, together with a portion of the front face 20 of the body member 18 that is intermediate the archwire slot surfaces 30, 32 of the projections 26, 28, define an archwire slot 34.

Figure 2:
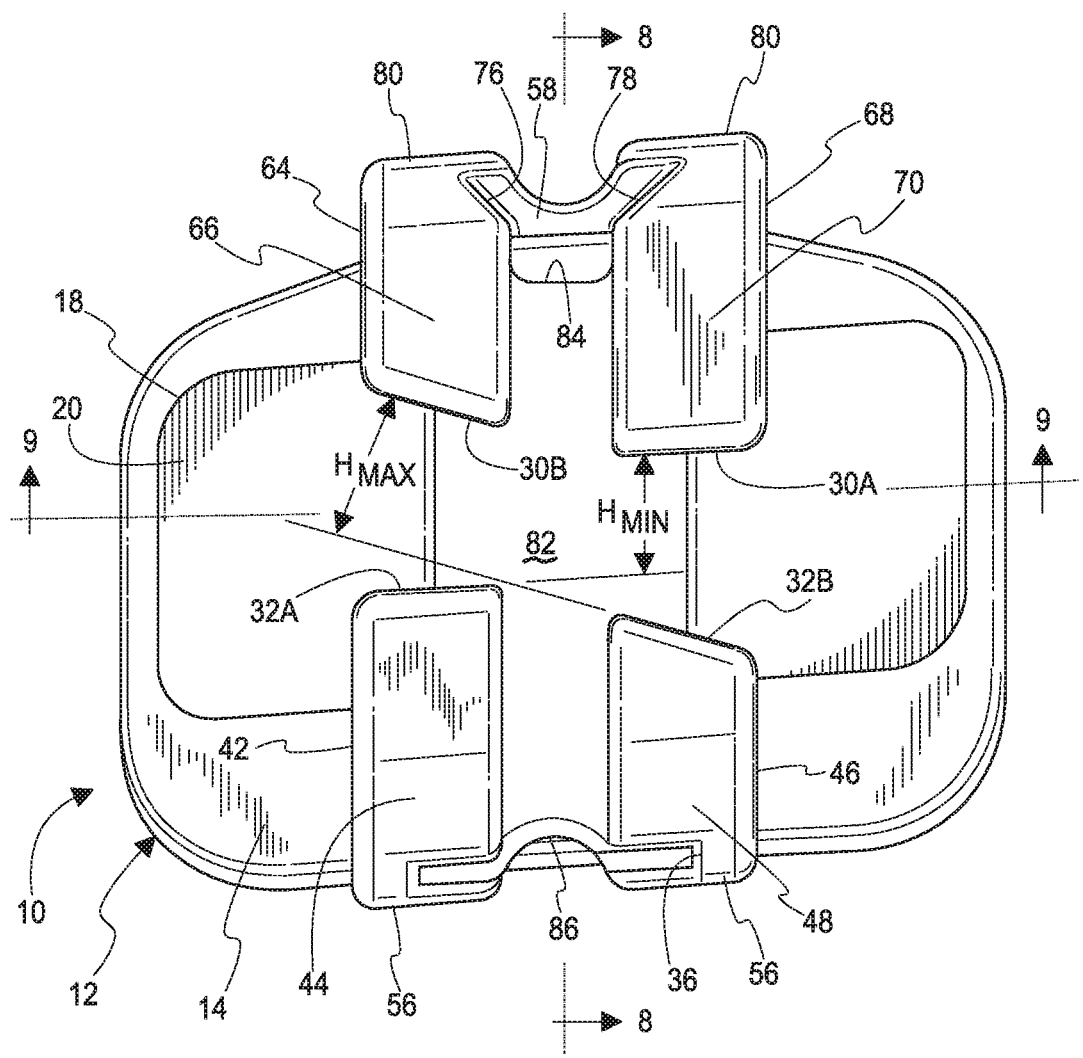
FIG. 2 is a front elevation view of the bracket of FIG. 1.

Each archwire slot surface 30, 32 includes two segments, namely, a horizontal uprighting stop and an inclined tipping stop, which intersect at a fulcrum. Thus, as best seen in FIG. 2, the gingival slot surface 30 has a horizontal uprighting stop 30A and an inclined tipping stop 30B. The stops 30A, 30B intersect one another at a fulcrum 30C (FIG. 5). Likewise, the occlusal slot surface 32 has a horizontal uprighting stop 32A and an inclined tipping stop 32B, intersecting at fulcrum 32C (FIG. 3). As best seen in FIG. 3, the gingival uprighting stop 30A intersects the front face 20 of the body member 18 at a root 30R. The occlusal uprighting stop 32A intersects the front face 20 of the body member 18 at a root 32R.

It can be seen that the uprighting stops 30A and 32A are parallel and horizontally opposed to one another. The tipping stops 30B and 32B are similarly generally parallel and opposed to one another. As seen in FIG. 2 the planes defined by the uprighting stops 30A and 32A are separated by a distance $H_{min}$. The planes defined by the tipping stops 30B and 32B are separated by a distance $H_{max}$. In a typical bracket $H_{min}$ may be equal to 0.022 inches while $H_{max}$ may be equal to 0.028 inches. Other dimensions could be used, depending on the archwire sizes needed.

Figure 8:
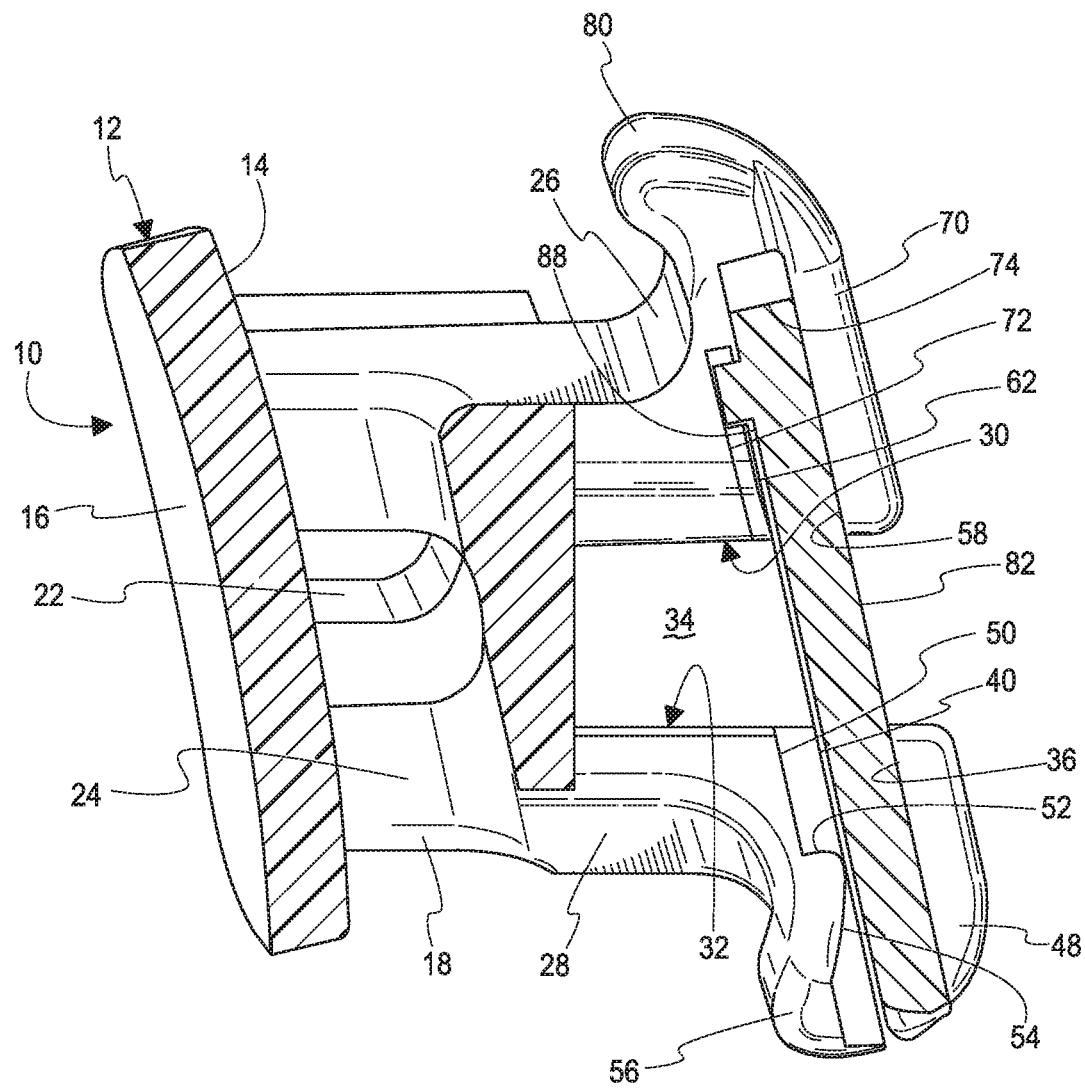
FIG. 8 is a section view taken along line 8-8 of FIG. 2.
Figure 10:
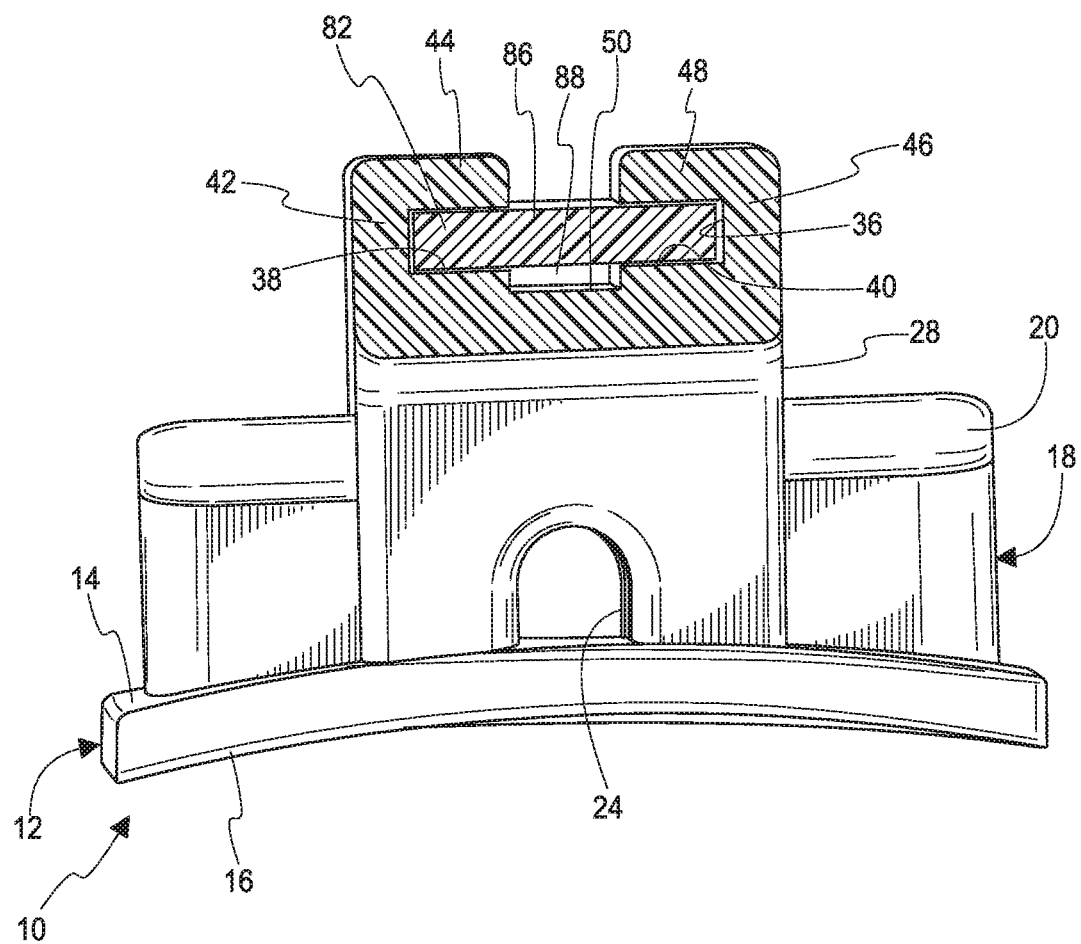
FIG. 10 is a section view taken along line 10-10 of FIG. 3.
Figure 12:
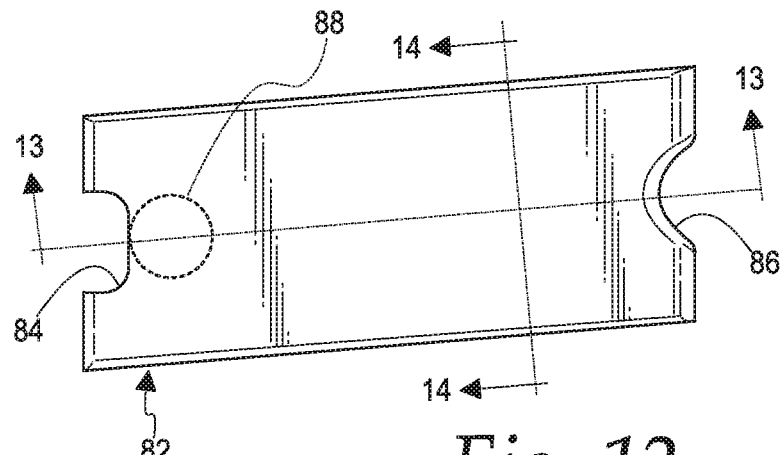
FIG. 12 is a front elevation view of the movable door.
Figure 13:
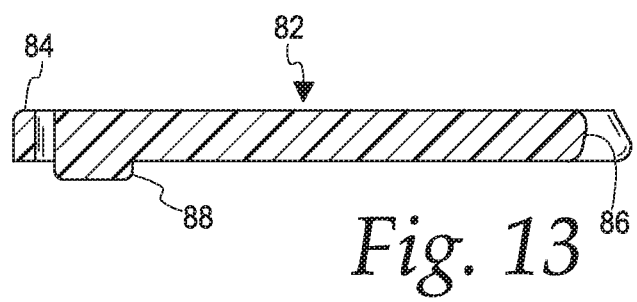
FIG. 13 is a section view taken along line 13-13 of FIG. 12.
Figure 14:
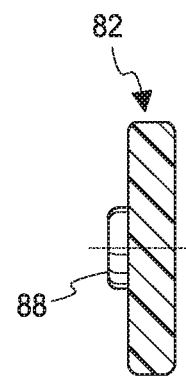
FIG. 14 is a section view taken along line 14-14 of FIG. 12.
Figure 11:
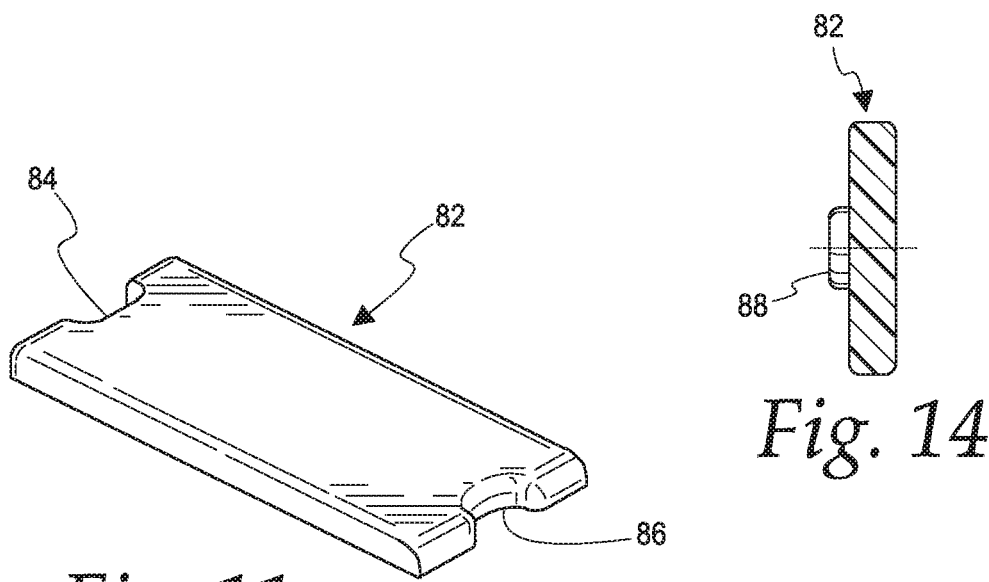
FIG. 11 is front a perspective view of the movable door.
Figure 15:
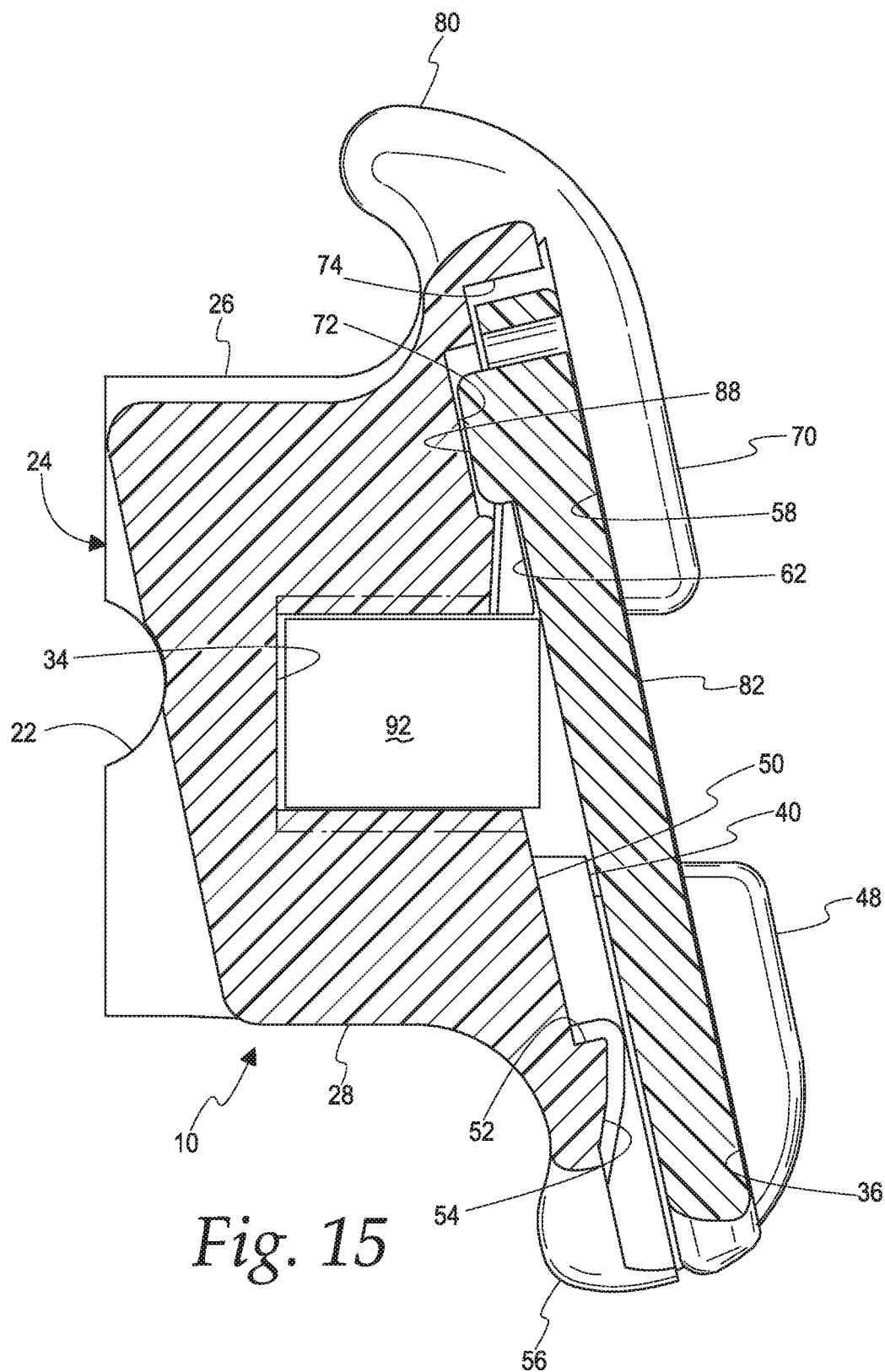
FIG. 15 is a left end elevation, partially in section, view of a portion of the bracket of FIG. 1 but omitting the bonding base and some of the body member, showing a rectangular archwire in the archwire slot, typically at an end of Stage III treatment.

As best seen in FIGS. 8 and 10, the occlusal projection 28 has a first channel 36 formed therein. The first channel is defined by a bed to which are attached a pair of angle members that each has a side wall and a tab. In this embodiment the bed is formed by first and second shoulders 38 and 40. The first angle member has a first side wall 42 attached to first shoulder 38 and extending forwardly therefrom. A first tab 44 is attached to the first side wall 42 at a point spaced from the first shoulder 38. The first tab 44 extends mesially-distally from the first side wall 42. The second angle member has a second side wall 46 attached to second shoulder 40 and extending forwardly therefrom. A second tab 48 is attached to the second side wall 46 at a point spaced from the second shoulder 40. The second tab 48 extends mesially-distally from the second side wall 46. It will be noted that while the first and second tabs 44 and 48 extend toward one another, in this embodiment they do not touch one another. This arrangement leaves a gap between the tabs 44 and 48. The first channel 36 is defined as the space between the shoulders 38, 40, the side walls 42, 46 and the tabs 44, 48.

The bed portion of the first channel 36 includes a socket 50 formed between the shoulders 38, 40 as seen in FIG. 8. The socket 50 is bounded on the bottom by a catch 52. The catch joins an inclined ramp surface 54. The ramp 54 and catch 52 permit insertion of a movable door 82 into the first channel 36 from the bottom of the first channel but prevent removal of the door 82 from the channel. This will be explained below in further detail. The occlusal protrusion 28 has at its lower end a pair of tie wings 56.

Figure 9:
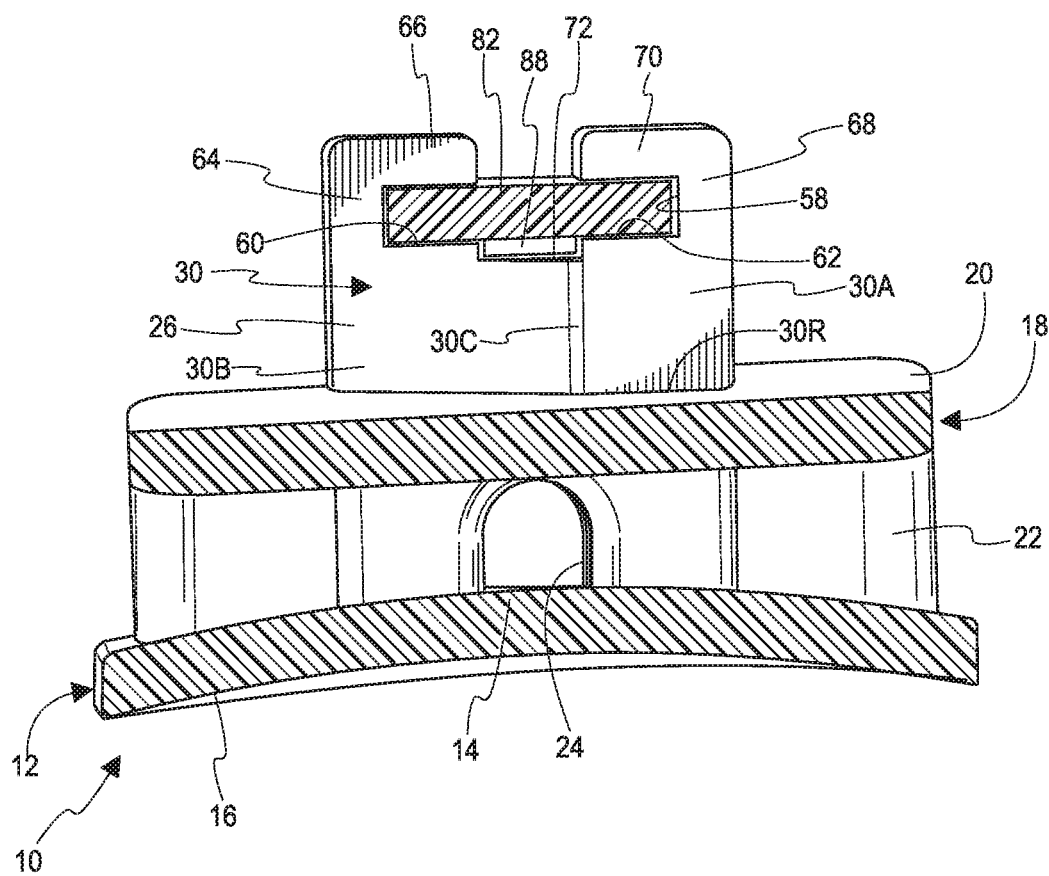
FIG. 9 is a section view taken along line 9-9 of FIG. 2.

As best seen in FIGS. 8 and 9, the gingival projection 26 has a second channel 58 formed therein. Like the first channel 36, the second channel 58 is defined by a second bed to which are attached third and fourth angle members that each has a side wall and a tab. In this embodiment the second channel's bed is formed by third and fourth shoulders 60 and 62. The third angle member has a third side wall 64 attached to the third shoulder 60 and extending forwardly therefrom. A third tab 66 is attached to the third side wall 64 at a point spaced from the third shoulder 60. The third tab 66 extends mesially-distally from the third side wall 64. The fourth angle member has a fourth side wall 68 attached to the fourth shoulder 62 and extending forwardly therefrom. A fourth tab 70 is attached to the fourth side wall 68 at a point spaced from the fourth shoulder 62. The fourth tab 70 extends mesially-distally from the fourth side wall 68. It will be noted that while the third and fourth tabs 66 and 70 extend toward one another in this embodiment they do not touch one another. This arrangement leaves a gap between the tabs 66 and 70. This provides access to the movable door 82 that will be described below. The second channel 58 is defined as the space between the third and fourth shoulders 60, 62, the third and fourth side walls 64, 68 and the third and fourth tabs 66, 70.

The bed portion of the second channel 58 includes a depression 72 formed between the third and fourth shoulders 60, 62 as seen in FIG. 8. The depression 72 is bounded on the top by stop surface 74. The stop surface limits insertion of the movable door 82 described below. The depression 72 has an inclined or angled lower edge that permits deliberate insertion and removal of a movable door into and out of the second channel 58 but prevents inadvertent or unintended removal of the door 82 from the channel. This will be explained below in further detail.

Figure 1:
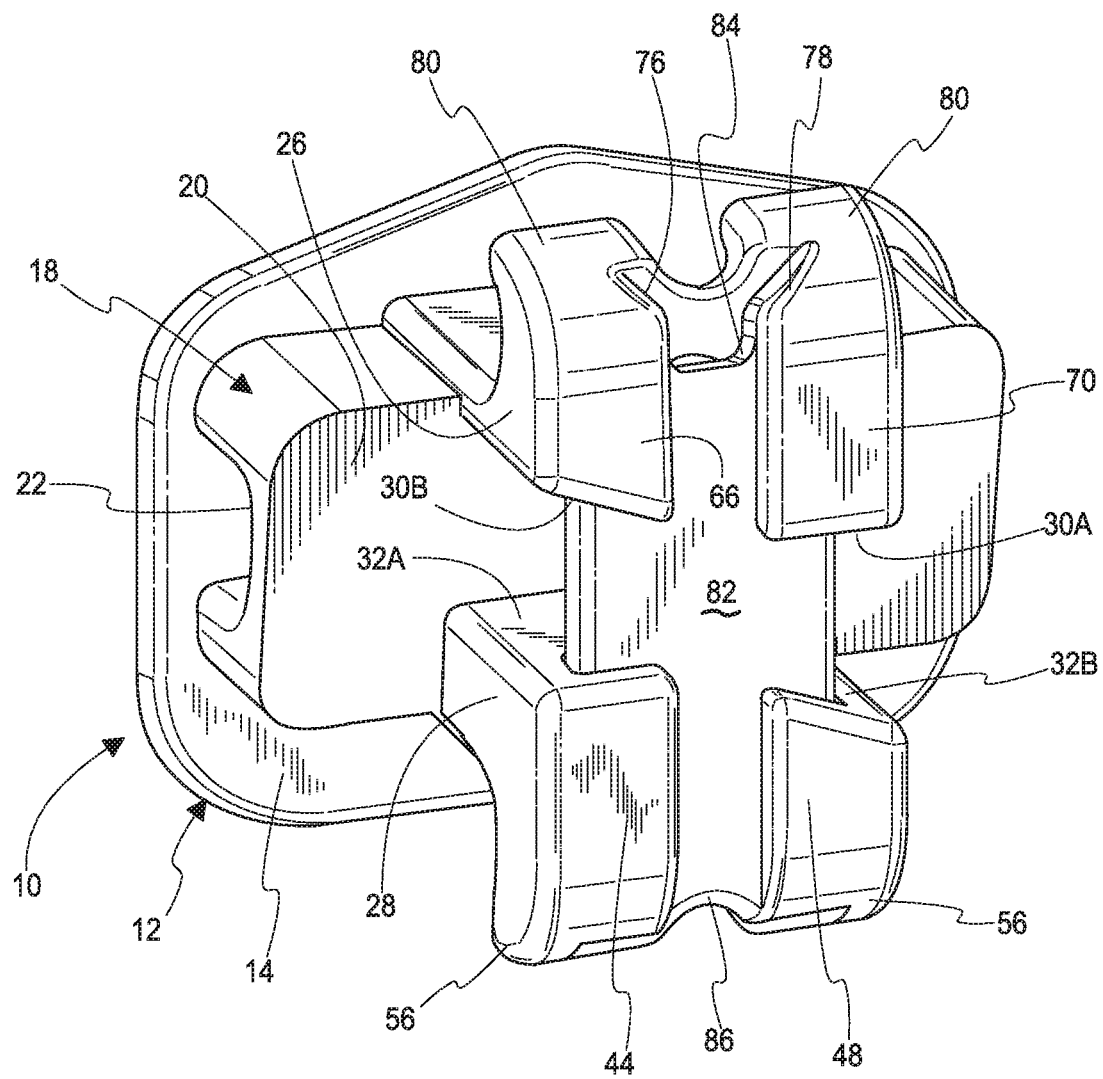
FIG. 1 is a perspective view of an orthodontic bracket of the present disclosure for a maxillary right canine having a movable door in a closed position.
Figure 6:
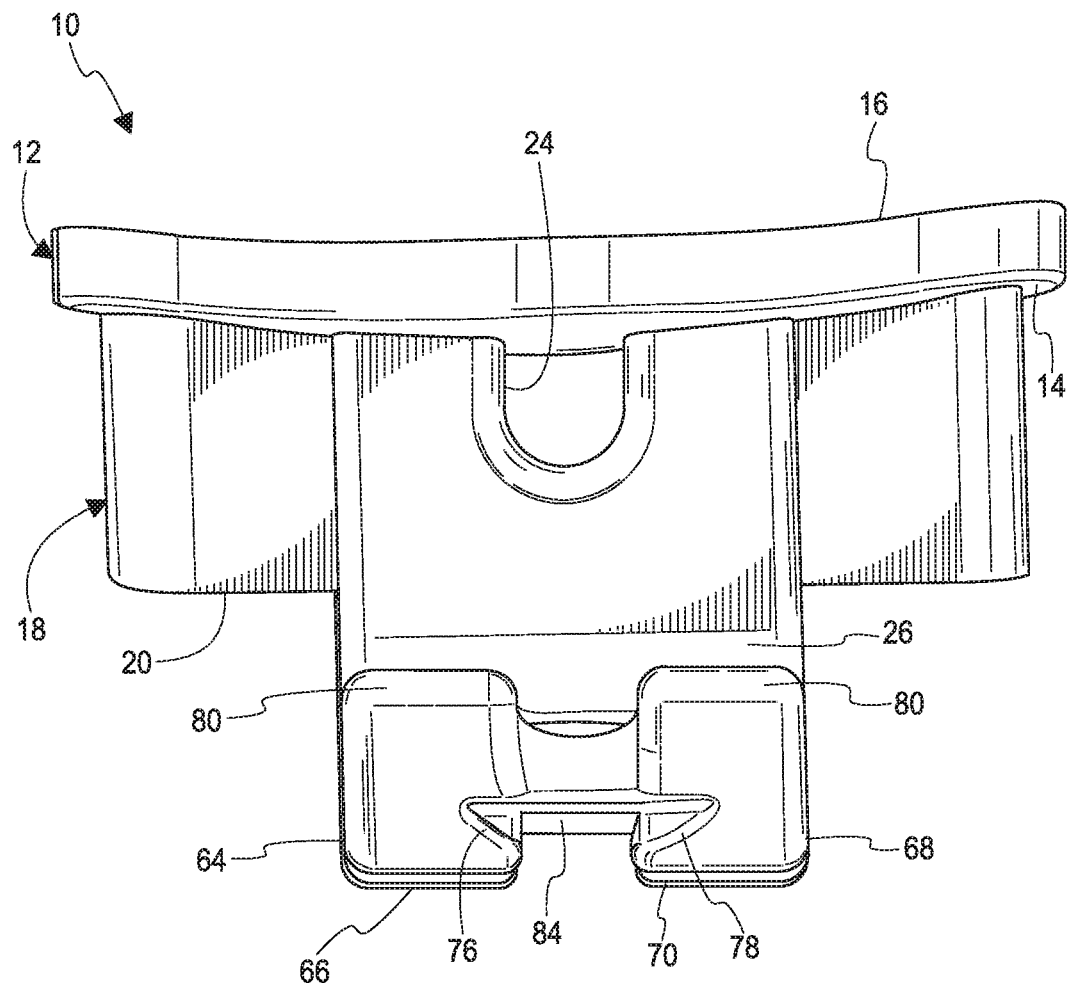
FIG. 6 is a top plan view of the bracket of FIG. 1.
Figure 7:
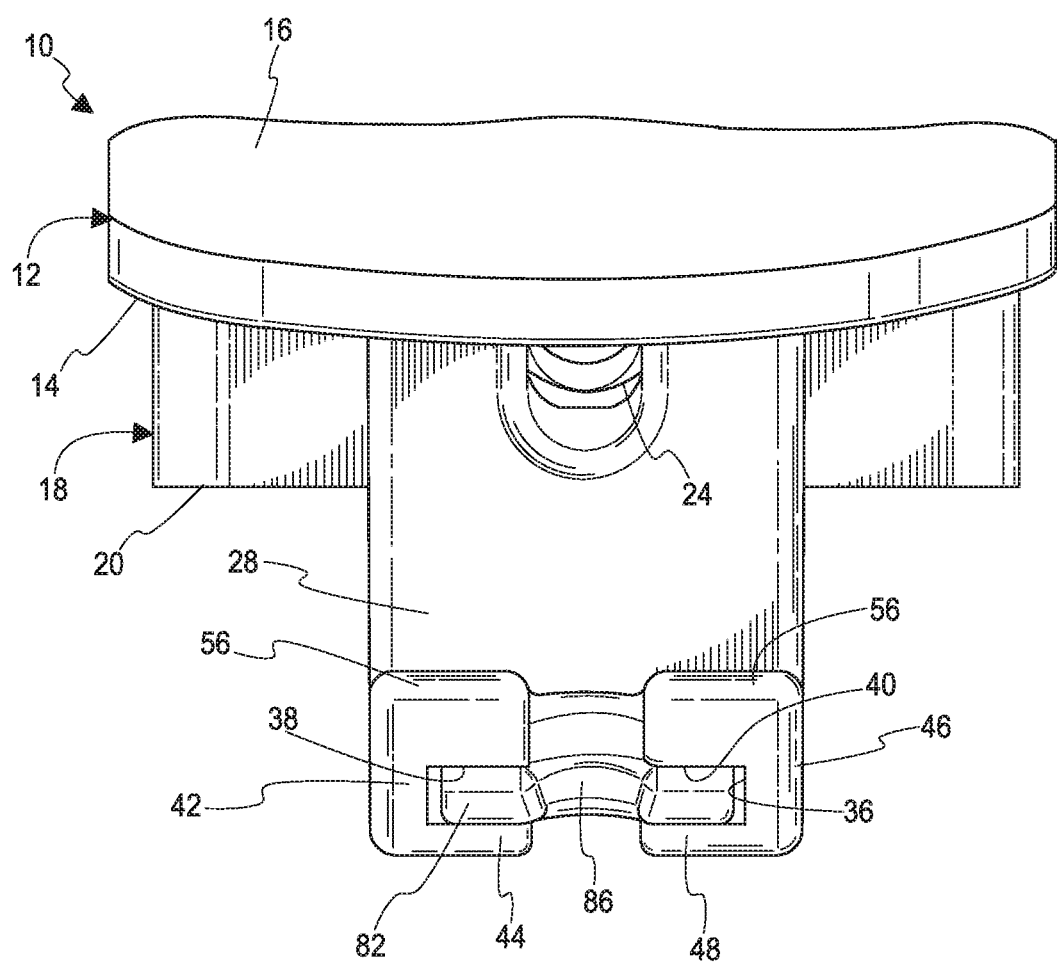
FIG. 7 is a bottom plan view of the bracket of FIG. 1.

As best seen in FIGS. 1, 2 and 6 one end, such as an upper end, of each of the third and fourth tabs 66 and 70 has an angled surface 76 and 78, respectively. The angled surfaces 76, 78 are on the ends of the tabs, which are remote from the archwire slot surface 30. The angled surfaces 76, 78 face one another and together define a V-shaped notch. The V-shaped notch tends to funnel or guide a manipulation tool, such as an explorer, to the upper end of the movable door 82. This assists the practitioner in quickly and conveniently grasping and sliding the movable door from a closed position to an open position. The V-shaped notch partially extends into the tie wings 80 formed in the occlusal projection 28.

FIGS. 11-14 illustrate the movable door 82. The door generally has a parallelogram shape in the front elevation view of FIG. 12. Generally U-shaped cutouts 84, 86 are formed in the end edges of the door. The cutouts assist the practitioner in engaging the door 82 with a manipulation tool for opening and closing the door. The lingual side of the door 82 has a detent 88 that protrudes from the interior surface of the door. The detent 88 fits in the space between the first and second shoulders 38, 40 of the first channel 36. When the door 82 is closed, the detent 88 also fits in the space between the third and fourth shoulders 60, 62 of the second channel 58. Upon factory assembly of the door 82 and bracket body 12, the door 82 will be inserted into the first channel 36 from the lower end thereof as seen in the drawings. As the detent 88 enters the channel 36 it will encounter the ramp surface 54 and slight flexing will allow the detent to enter the socket 50. The catch 52 at the bottom of the socket 50 has an angle which will engage the detent 88 in a manner that prevents withdrawal of the detent, and therefore the door, from the first channel. Upon movement of the door 82 to a raised, closed position, the detent 88 slides into the depression 72 in the second channel. The edge of the depression 72 is shaped to releasably engage the detent 88. The depression will retain the detent 88 against inadvertent opening forces but will release the detent upon deliberate application of an opening force, such as may be applied downward to the door 82 by a practitioner using a manipulation tool, such as an explorer.

Notably, the first and second channels 36 and 58 are coplanar with one another. This permits the movable door 82 to slide readily between an open position and a closed position. In the open position, the door is disposed in one of the first and second channels 36 and 58 but is spaced from the other of the first and second channels. When in a fully open position, the detent 88 is disposed within the socket 50 and the door is remote from the archwire slot 34 and provides access to and from the archwire slot 34. When the door 82 is in the raised, closed position the door lies in both the first and second channels 36 and 58 where it closes off the open side of the archwire slot 34 and prevents access to and from the archwire slot 34.

Also of note, the plane defined by the first and second channels 36 and 58 is disposed at an angle D (FIG. 5) relative to the reference plane A. The angle D is substantially equal to the torque angle T, seen in FIGS. 3 and 5. This means that in a bracket having a non-zero torque angle T (not parallel to angle A) the door 82 will be disposed at an angle D to the front face 20 of the body member 18. This geometry is advantageous because it will permit a rectangular archwire to be disposed in the archwire slot 34 such that the archwire is angled or canted with respect to the archwire slot surfaces. Further, the door 82 will not interfere with or apply a force to such a canted archwire. The depth of the archwire slot 34 further enhances this effect and advantageously permits freedom of movement of each bracket 10 relative to the archwire. As seen in FIG. 3, the depth of the archwire slot 34 is defined by distances D1 and D2. D1 is the distance from the lingual surface of the door 82 to the root point 30R. Similarly, D2 is the distance from the lingual surface of the door 82 to the root point 32R. D1 and D2 are chosen such that the lesser of these two distances is greater than the height $H_{min}$. Generally speaking, this means the archwire slot 34 is deeper than it is high. This means that the door 82 will tend to remain passive, such that the closed door will not tend to apply any force to the archwire in the archwire slot 34 as the teeth become lingually aligned.

The use, operation and function of the bracket 10 are as follows. It will be noted that the archwire slot 34 has both horizontal uprighting stops 30A, 32A and inclined tipping stops 30B, 32B. These stops permit use of the Tip-Edge® (trademark of TP Orthodontics, Inc.) technique. The Tip-Edge® technique is fully described in U.S. Pat. Nos. 5,125,832 and 6,682,345, both assigned to TP Orthodontics, Inc. and the disclosures of which are incorporated herein by reference.

Figure 16:
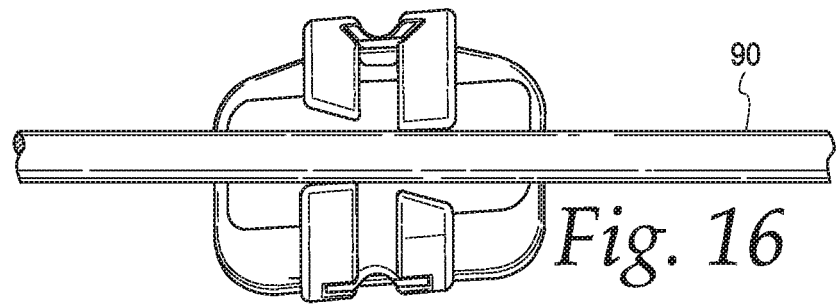
FIG. 16 is a schematic front elevation view of a bracket for a maxillary right canine at a start of Stage I treatment and having a round archwire in the archwire slot.
Figure 17:
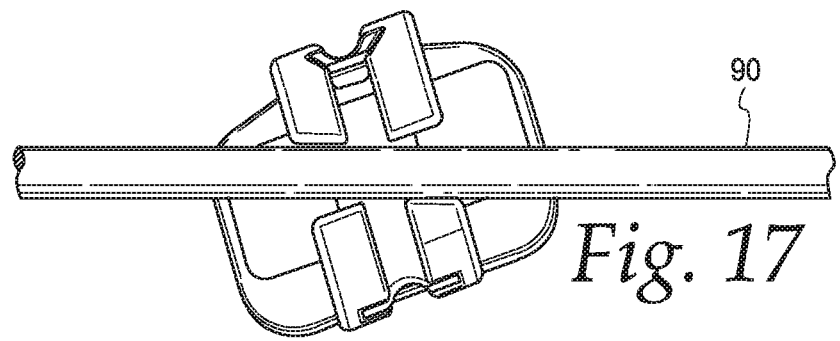
FIG. 17 is a view similar to FIG. 16 showing the bracket as it would be tipped at the end of Stage II treatment.

The orthodontist or practitioner bonds the rear surface 16 of the bonding base 12 of each of a plurality of brackets 10 to the crowns of a plurality of teeth, and provides for anchorage at the molars for ends of an archwire. A typical treatment plan would begin with Stage I wherein a round archwire 90 is placed in the archwire slot 34 of each bracket 10, as represented in FIG. 16. As the archwire 90, which may be constructed of nickel-titanium or other suitable materials, seeks to return to its initial, straight condition throughout Stages I and II of treatments, it will apply tipping forces to the brackets 10, causing the brackets 10 (and the corresponding teeth to which the brackets are bonded) to tip to the extent permitted by the tipping stops 30B, 32B. The tipped bracket at the end of Stage II is shown in FIG. 17.

Figure 18:
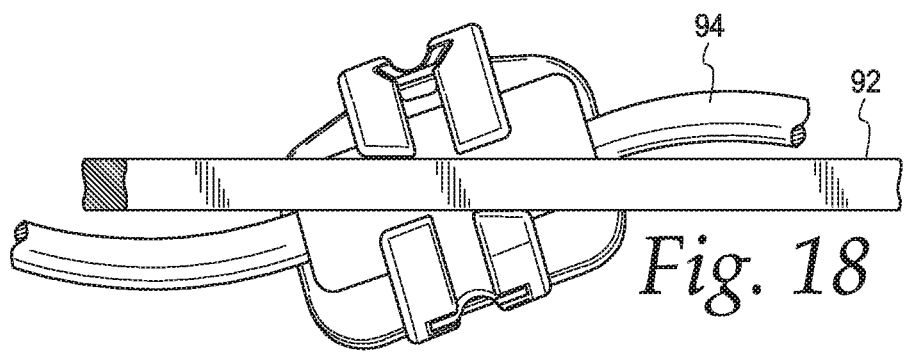
FIG. 18 is a view similar to FIG. 16 but showing the bracket fitted with a rectangular archwire in the archwire slot and a round archwire in the uprighting tunnel at the beginning of Stage III treatment.
Figure 19:
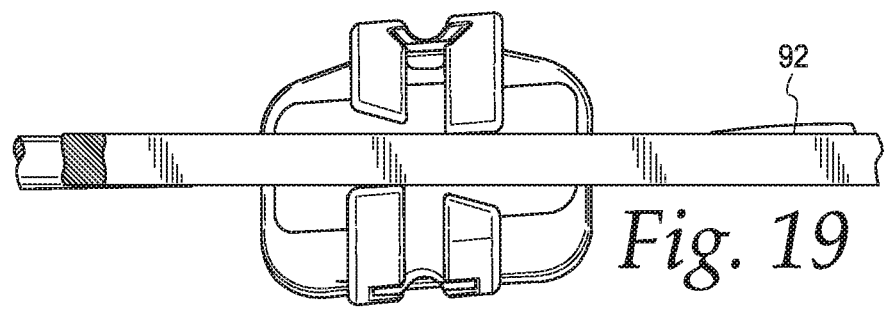
FIG. 19 is a view similar to FIG. 18 but with the bracket uprighted as it would be at the end of Stage III treatment.
Figure 20:
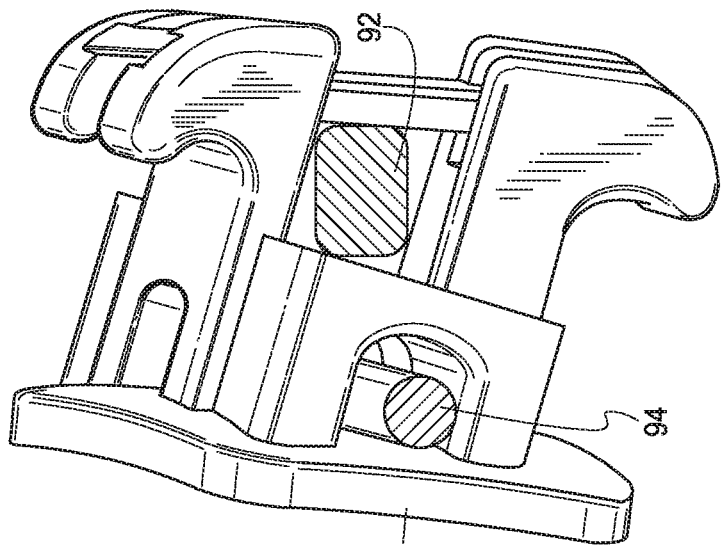
FIG. 20 is a left end elevation view of the bracket of FIG. 1 fitted with a round auxiliary archwire in the uprighting tunnel, showing the initial engagement of a rectangular archwire in the front archwire slot at the beginning of Stage III treatment.

The start of Stage III is shown in FIGS. 18 and 20. A rectangular archwire 92 is placed in archwire slot 34 and a round archwire 94 is placed in the uprighting tunnel 22. In an embodiment with the above described archwire slot, namely, $H_{max}$=0.028 inches and $H_{min}$=0.022 inches, the rectangular archwire dimensions could be, for example, 0.0215 inches high and 0.028 inches wide, although an archwire having other dimensions could be used. With the bracket tipped as in FIG. 18, the maximum archwire slot height $H_{max}$ is available to the rectangular archwire 92 and it will fit in the archwire slot 34 without binding or otherwise applying a force on the archwire 92, even though the archwire is tilted or canted with respect to the archwire slot 34. See FIG. 20. The round archwire 94 will apply an uprighting force that will rotate the brackets 10 toward the orientation of FIG. 19, as limited by the uprighting stops 30A, 32A.

As this rotation occurs, the available slot height begins to change from $H_{max}$, moving toward $H_{min}$. As a result, a point is reached where further closing of the bracket is obstructed by the opposite corners of the rectangular archwire 92. Contact is established at these corners as shown by the small arrows of FIG. 21. The round archwire 94 continues to apply an uprighting force that continues to close down the vertical dimension or height of the archwire slot 34 and this generates a secondary torqueing couple which when established will create torque in the direction of the heavy arrow in FIG. 21. From here, torque and uprighting forces are delivered simultaneously. This continues until the bracket is fully closed down on the vertical dimension of the rectangular archwire 92, so as to be flush with the horizontal uprighting stops 30A, 32A, as seen in FIGS. 22 and 19.

Figure 21:
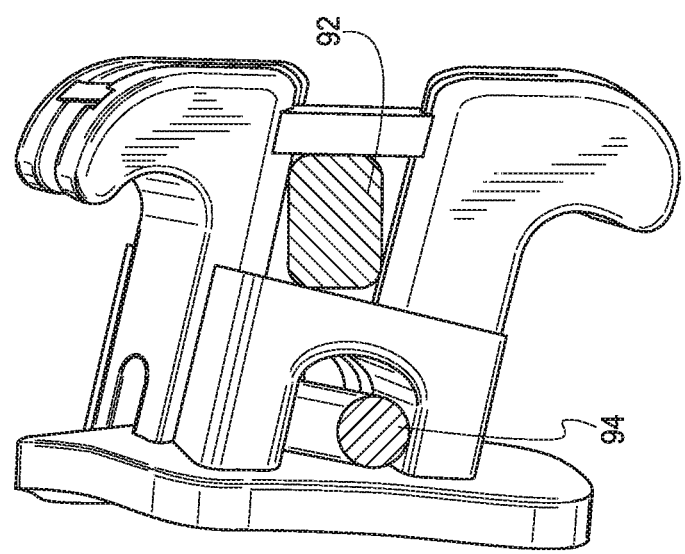
FIG. 21 is a left end elevation view similar to FIG. 20, showing the engagement of a rectangular archwire in the front archwire slot at an intermediate point of Stage III treatment.
Figure 22:
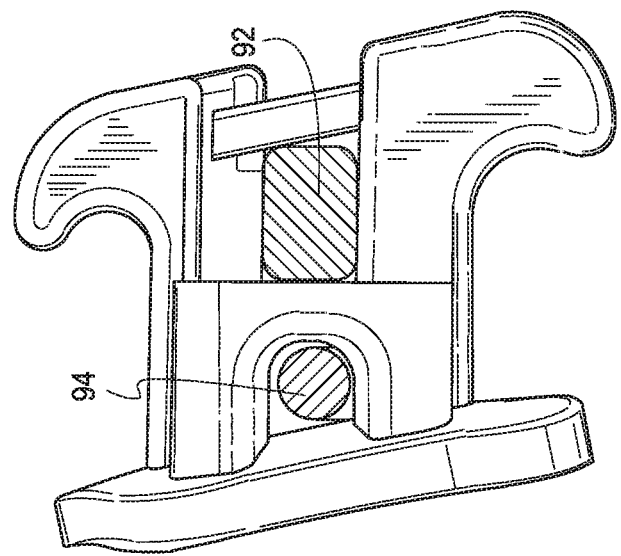
FIG. 22 is a left end elevation view similar to FIG. 20, showing the engagement of a rectangular archwire in the archwire slot at the end of Stage III treatment wherein uprighting and torqueing of a tooth is fully realized.

FIGS. 21-22 illustrate the advantage of the present disclosure having the movable door disposed in the first and second channels at an angle substantially equal to the torque angle of the bracket. The angled door accommodates the canted rectangular archwire 92 used in the archwire slot 34 at the beginning of Stage III without binding the archwire such as may occur with ligature, and while tending not to apply any force to the archwire.

Another key benefit the movable door offers is a solid positive surface for the archwire to press against creating a "tube" for structure and offering more torqueing to fully appreciate the prescription built into the bracket. Elastomeric ligatures lose their elasticity after several hours and take a set that limits the energy to hold the archwire against the bracket archwire slot, becoming passive in moving the tooth to the desired final position. The elastomeric ligature must be replaced and for a short time the new ligature offers the energy to begin moving the tooth. Then, elasticity again stops and the ligature takes a set. With the bracket of the present disclosure the lingual side of the door offers a surface against which the archwire may push, thereby moving the tooth into the final prescribed position built into the bracket. This can be visualized as follows. Suppose a particular tooth is misaligned lingually and to obtain the proper position the tooth needs to be torqued in a buccal/labial direction. An archwire may be disposed in the outer archwire slot such that the archwire tends to torque the tooth in the desired forward, buccal/labial direction. But with the outer archwire being open to the front there is no structure for the archwire to press against in the forward direction. The archwire will tend to pop out of the open slot. As mentioned, elastic ligatures will provide some resistance to the archwire coming out of the slot, but such resistance by an elastomeric ligature is quite temporary. In contrast, the interior surface of the closed movable door provides a solid, fixed surface against which the archwire in the outer slot can press, urging the tooth to the desired position.

It should be understood that various changes and modifications to the presently preferred embodiments described herein will be apparent to those skilled in the art. Such changes and modifications can be made without departing from the spirit and scope of the invention disclosed herein. For example, while the base is shown herein as having basically a single thickness, the base could have multiple layers forming a stepped configuration. That is, there may be a bottom layer or pad whose rear surface will attach to the crown of a tooth plus a smaller outer layer or pad on the front of the bottom layer but having a smaller perimeter than the bottom layer. The body member is attached to the outer layer of the base and an archwire slot is bounded on the rear edge by the front surface of the outer layer of the base. Such an outer layer or pad on the front surface of a bottom layer may still be considered part of the base.

The invention claimed is:

1. A self-ligating orthodontic bracket, comprising:
a bonding base having front and rear surfaces, the rear surface being adapted for attachment to a crown of a tooth;
   a body member attached to the front surface of the bonding base and extending forwardly therefrom to a front face of the body member, the front face of the body member defining a reference plane, the bonding base defining a torque angle with respect to the reference plane;
   an uprighting tunnel extending mesially-distally through the body member;
   gingival and occlusal projections extending forwardly from the front face of the body member, the gingival projection having an archwire slot surface on one side thereof and the occlusal projection having an archwire slot surface on one side thereof, the archwire slot surfaces being spaced from one another in opposed facing relation such that the archwire slot surfaces, together with the portion of the front face of the body member that is intermediate the archwire slot surfaces of the projections, define an archwire slot;
   a first channel defined in the occlusal projection and further comprising a bed and opposed members having side walls extending forwardly and tabs extending from the side walls and toward each other mesially-distally with a gap therebetween, and a second channel defined in the gingival projection and further comprising a bed and opposed members having side walls extending forwardly and tabs extending from the side walls and toward each other mesially-distally with a gap therebetween, the channels being aligned with one another in the same plane, which plane is disposed at an angle to the reference plane that is substantially equal to the torque angle; and
   a door disposed in one of the first and second channels between the opposed side walls and between the bed and tabs thereof, the door being movable between an open position and a closed position, such that when the door is in the open position the door is spaced from the other of the first and second channels and provides access to and from the archwire slot, and when the door is in the closed position it lies in both the first and second channels between the respective opposed side walls and between the respective bed and tabs thereof and prevents access to and from the archwire slot; and
   further comprising a detent formed on a lingual side of the door, and a socket formed in said one of the first and second channels, the socket being releasably engageable with the detent when the door is in an open position to retain a portion of the door in said one of the first and second channels, and a depression formed in said other of the first and second channels, the detent being releasably engageable with the depression when the door is closed to retain a portion of the door in said other of the first and second channels.

2. The orthodontic bracket of claim 1 wherein each archwire slot surface comprises a horizontal uprighting stop and a tipping stop disposed at an angle to the uprighting stop.

3. The orthodontic bracket of claim 2 wherein the uprighting stops on the gingival and occlusal projections are parallel and opposed to one another and the tipping stops on the gingival and occlusal projections are generally parallel and opposed to one another.

4. The orthodontic bracket of claim 3 wherein the gingival and occlusal uprighting stops are separated by a minimal slot height ($H_{min}$), the gingival and occlusal archwire slot surfaces intersecting the front face of the body member at a gingival root and an occlusal root, respectively, a distance from the gingival root to a lingual surface of the closed door defining a distance (D1), a distance from the occlusal root to the lingual surface of the closed door defining a distance (D2), with the lesser of (D1) and (D2) being greater than ($H_{min}$).

5. The orthodontic bracket of claim 1 wherein the gingival and occlusal archwire slot surfaces are separated by a minimal slot height ($H_{min}$), the gingival and occlusal archwire slot surfaces intersecting the front face of the body member at a gingival root and an occlusal root, respectively, a distance from the gingival root to the lingual surface of the closed door defining a distance (D1), a distance from the occlusal root to the lingual surface of the closed door defining a distance (D2), with the lesser of (D1) and (D2) being greater than ($H_{min}$).

6. The orthodontic bracket of claim 1 wherein the furthest end of each tab of the other of the first and second channels has an angled surface, the angled surfaces of the tabs facing one another to define a V-shaped notch extending toward and providing guided access to an edge of the door.

7. A self-ligating orthodontic bracket, comprising:
a bonding base having front and rear surfaces, the rear surface being adapted for attachment to a crown of a tooth;
   a body member attached to the front surface of the bonding base and extending forwardly therefrom to a front face of the body member;
   gingival and occlusal projections extending forwardly from the front face of the body member, the gingival projection having an archwire slot surface on one side thereof and the occlusal projection having an archwire slot surface on one side thereof, the archwire slot surfaces being spaced from one another in opposed facing relation such that the archwire slot surfaces, together with the portion of the front face of the body member that is intermediate the archwire slot surfaces of the projections, define an archwire slot;
   a first channel defined in the occlusal projection and further comprising a bed and opposed members having side walls extending forwardly and tabs extending from the side walls and toward each other mesially-distally with a gap therebetween, and a second channel defined in the gingival projection and further comprising a bed and opposed members having side walls extending forwardly and tabs extending from the side walls and toward each other mesially-distally with a gap therebetween, the channels being aligned with one another in the same plane;
   a door disposed in one of the first and second channels between the opposed side walls and between the bed and tabs thereof, the door being movable between an open position and a closed position, such that when the door is in the open position the door is spaced from the other of the first and second channels and provides access to and from the archwire slot, and when the door is in the closed position it lies in both the first and second channels between the respective opposed side walls and between the respective bed and tabs thereof and prevents access to and from the archwire slot; and wherein the furthest end of each tab of the other of the first and second channels has an angled surface, the angled surfaces of the tabs facing one another to define a V-shaped notch extending toward and providing guided access to an edge of the door.

8. The orthodontic bracket of claim 7 further comprising a detent formed on a lingual side of the door, and a socket formed in said one of the first and second channels, the socket being releasably engageable with the detent when the door is in an open position to retain a portion of the door in said one of the first and second channels.

9. The orthodontic bracket of claim 8 wherein the detent is releasably engageable with the socket for movement in a direction toward the archwire slot but the detent is prevented from release from the socket in a direction away from the bracket.

10. The orthodontic bracket of claim 8 further comprising a depression formed in said other of the first and second channels, the detent being releasably engageable with the depression when the door is closed to retain a portion of the door in said other of the first and second channels.

11. The orthodontic bracket of claim 10 further comprising a stop surface in said other of the first and second channels wherein the stop surface engages the door to prevent movement of the door in a direction away from the bracket.

12. The orthodontic bracket of claim 8 further comprising a catch in said one of the first and second channels wherein the catch engages the detent on the door to prevent withdrawal of the detent and door from said one of the first and second channels.

* * * * *